April 28, 1953      A. M. JOCHIM      2,636,328
ROCK PICKER
Filed April 18, 1949      2 SHEETS—SHEET 1
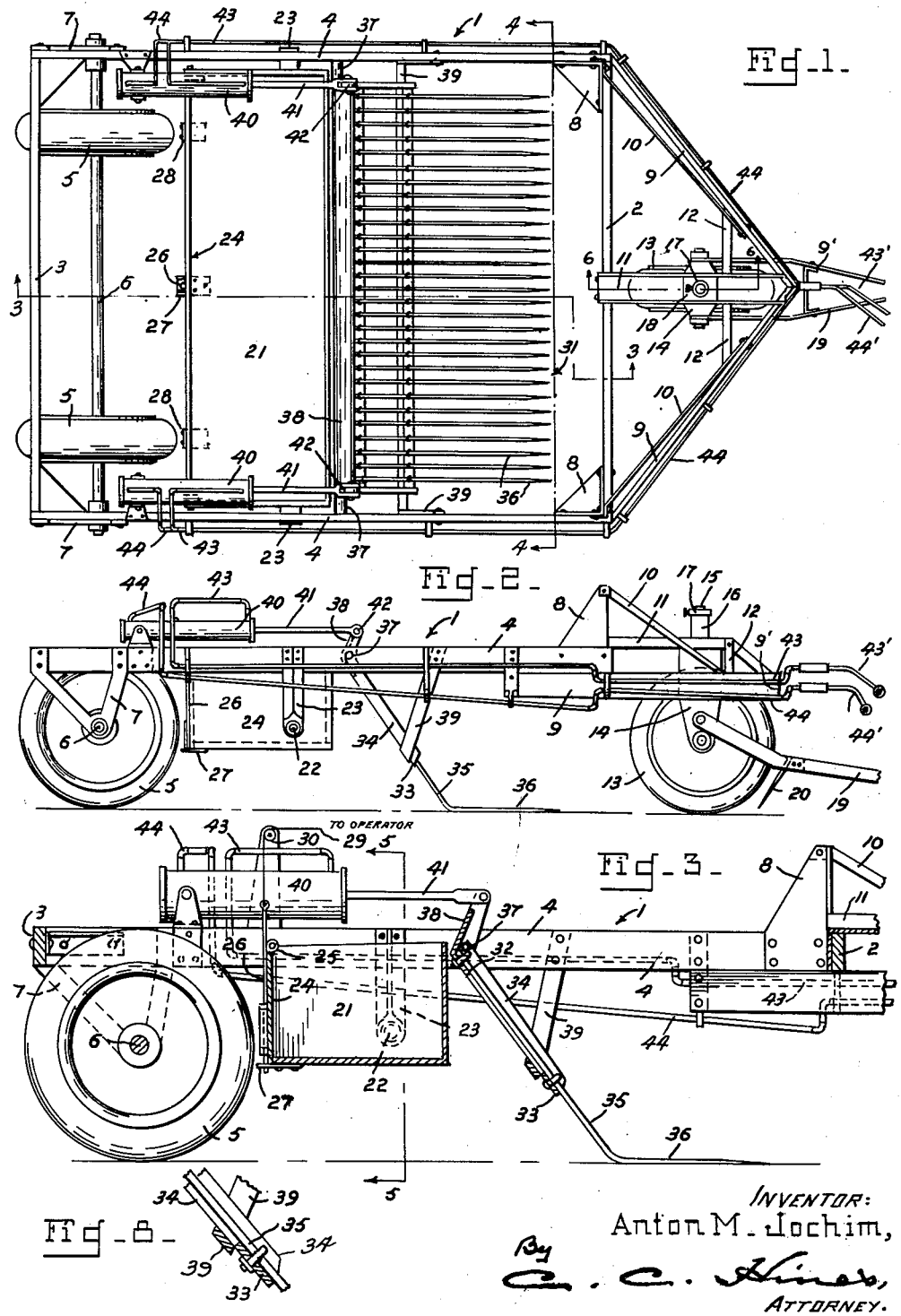

April 28, 1953  A. M. JOCHIM  2,636,328
ROCK PICKER
Filed April 18, 1949  2 SHEETS—SHEET 2
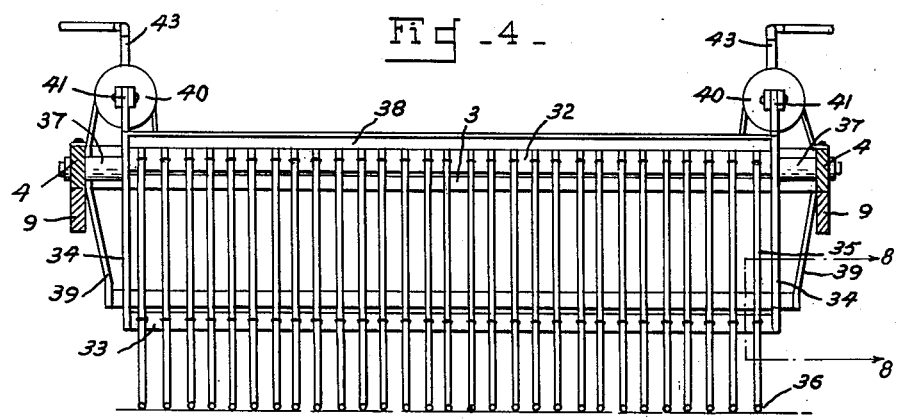
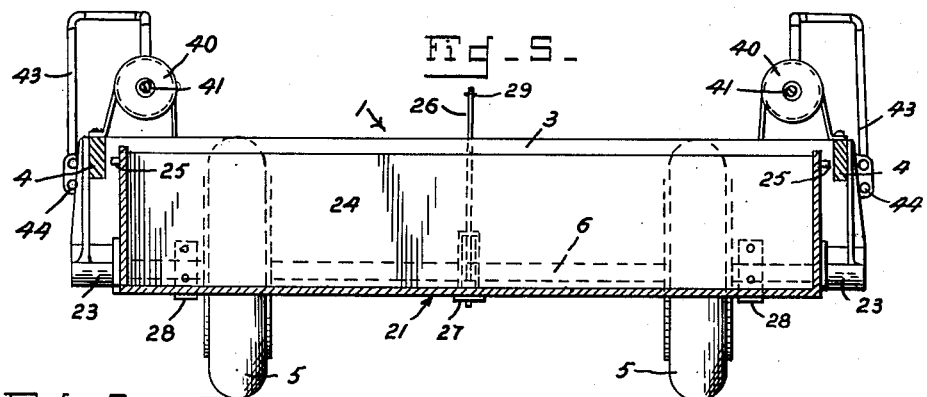
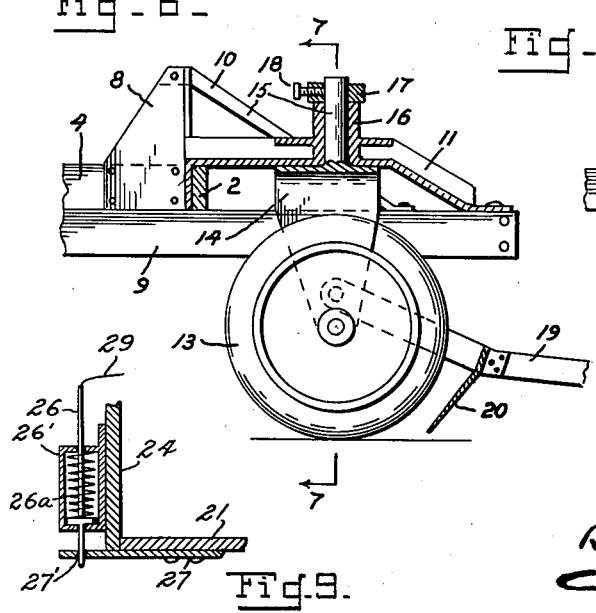
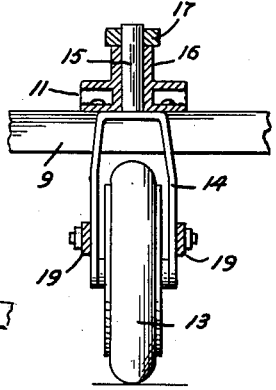
INVENTOR:
Anton M. Jochim,
By
A. C. Hinds,
ATTORNEY.

Patented Apr. 28, 1953

2,636,328

UNITED STATES PATENT OFFICE 2,636,328

ROCK PICKER

Anton M. Jochim, Inverness, Mont., assignor to Minn-Kota Manufacturing Company, Moorhead, Minn.

Application April 18, 1949, Serial No. 88,077

2 Claims. (Cl. 55—17)

1

This invention relates to improvements in rock pickers, and particularly to improvements in rock pickers of the type disclosed in my prior application, Serial No. 749,578, filed May 21, 1947, now Patent No. 2,519,136, for gathering loose rocks from a ground surface or field, transporting the gathered rocks to a point of deposit in the field or elsewhere, and dumping the gathered rocks at the deposit point.

One object of the present invention is to provide a novel construction and arrangement of gathering means and supporting wheels in a wheeled picker whereby the wheels will travel in contact with the ground in a path cleared or substantially cleared by the gathering means to insure smooth travel of the machine with the gathering means moving always in close proximity to the ground surface.

Another object of the invention is to provide readily controlled hydraulic means for operating a gathering rake to deposit the gathered rocks in a hopper or receptacle.

Still another object of the invention is to provide a novel mode of mounting the rake for swinging movements to and from its gathering position and stably supporting the rake in gathering position.

Still another object of the invention is to provide a novel construction of hopper or receptacle and means for controlling its movements between receiving and dumping positions.

Still another object of the invention is to generally simplify and improve the construction and increase the efficiency of devices of this character.

With these and other objects in view, the invention consists of the novel construction, combination and arrangement of parts hereinafter fully described and claimed, and as shown in the accompanying drawings, in which:

Figure 1 is a top plan view of a rock picker embodying my invention, showing the rake in gathering position and the hopper in receiving position.

Figure 2 is a view in side elevation of the same.

Figure 3 is a vertical longitudinal section on an enlarged scale through the device taken substantially on line 3—3 of Fig. 1.

Figure 4 is a vertical transverse section taken substantially on line 4—4 of Figure 1.

Figure 5 is a similar view taken substantially on line 5—5 of Figure 3.

Figure 6 is a vertical longitudinal section on an enlarged scale, taken substantially on line 6—6 of Fig. 1, through the front wheel and its mounting and showing the draft tongue connection therewith.

Figure 7 is a transverse section on line 7—7 of Figure 6.

Figure 8 is an enlarged detail section taken substantially on line 8—8 of Fig. 4, through a part of the rake and its stop-brace on the frame.

Figure 9 is a sectional view on an enlarged scale through the latch casing and latch keeper, showing the latch bar in engagement with the keeper.

In carrying my invention into practice, I provide a travelling vehicle embodying a wheeled frame 1 formed of angle metal or other suitable material and comprising a front cross bar 2, a rear cross bar 3 and longitudinal side bars 4, which are suitably joined together. At its rear the frame is supported by wheels 5 mounted on a shaft 6 carried by brackets 7 secured to and depending from the side bars 4. At its front the frame is reinforced by corner brackets 8, secured to and extending upward from the bars 2 and 4, and extending forwardly from the front corners of the frame are reaches 9 which converge in a forward direction and are joined together at their forward ends at a point 9' coincident with the longitudinal center line of the frame. These reaches are connected with and reinforced from the brackets 8 by stays 10 and have their forward ends connected with the center of the bar 2 by a bridge piece 11 arranged above and braced from the reaches by stays 12. The bridge piece 11 serves not only as a center line brace between the bar 2 and reaches 9 but also as a support for a front supporting and steering wheel 13. As shown, the wheel 13 is journaled in the arms of an inverted U-shaft bracket 14, the upper cross bar of which carries a stub-shaft 15 which extends upward through and is journaled in a bearing sleeve 16 carried by the bridge piece 11, whereby the wheel is journaled to rotate in the bracket and swiveled to the bridge piece for steering movements. At its upper end the shaft 15 projects above the sleeve and is fitted with a collar 17 secured thereto by a set-screw 18 whereby it is held from downward displacement in the bearing sleeve. Pivoted at their rear ends to the arms of the bracket 14 are the spaced arms of a draft tongue 19, the forward portion of which is suitably constructed in practice for attachment to a tractor whereby the picker may be drawn over a ground surface from which rocks are to be picked and automatically steered in its travel. Secured to the draft tongue and projecting downwardly therefrom in front of the wheel 13 is a deflector plate or blade 20 which protects the wheel from injury by rocks and serves to deflect loose rocks out of the path of the wheel to keep the wheel traveling in contact with the ground.

Disposed at the rear of the frame between the transverse center of the frame and the wheels 5 is a gathering box or hopper 21 which is of oblong rectangular form and of a length somewhat less than the distance between the bars 4. The box is normally open at top and rear and is hinged or pivoted at its ends, as shown at 22, to bracket arms 23 depending from the bars 4. These hinges are arranged in advance of the center of the box to adapt the box, when freed for movement, to swing downwardly and rearwardly, under weight of a load of rocks therein, to discharge the rocks through its open rear portion onto the ground at a site of deposit. A gate 24 is hinged at the ends of its upper edge, as shown at 25, to the ends of the box to swing to an open position when the box is tilted for a dumping action and to swing to a position to close the normally open rear portion of the box when the box is returned to its receiving position. Slidably mounted on the gate preferably at a point intermediate its ends is a spring projected latch bar, bolt or rod 26 mounted with its projecting spring 26a in a guide casing 26', and whose lower end is adapted to engage an opening 27' in a keeper plate 27, secured to the bottom of the box, to hold the gate closed. Attached to the lower edge of the gate are spring metal retainer plates 28 adapted when the gate is closed to extend beneath the bottom of the box. These plates are preferably located adjacent to the ends of the gate and operate to hold the box bottom from sagging under weight of a load in the box and to keep the latch engaged with the keeper until the latch is positively released by the operator, and said plates also serve to properly guide the gate on its closing movement to ensure the bringing of the latch into alinement with the keeper for positive engagement therewith to hold the gate securely closed. Attached to the upper end of the latch is a cord or cable 29 which extends over a guide pulley 30 supported by the frame to a position in proximity to the driver's seat on the tractor, where it may be secured to suitable retaining means. Normally the resistance of this cord and that of the latch spring in connection with the supporting action of the retainers 28 is sufficient to hold the box in receiving position and the gate closed against the tendency of the box to tilt and dump under the weight of a load, but when a strong pull is exerted on the cord to retract the latch the pressure of the load on the gate will force it open against the resistance of the retainers 28 and the weight of the load will cause the box to tilt to dumping position. When the load is dumped a pull of the cord will cause the box to be swung back to receiving position and the gate to close, whereby the retainers 28 will be projected beneath the box bottom and hold the gate closed so that by slightly relaxing the cord the latch will be projected to engage the keeper. The gate controlling means will then hold the box in receiving position until the latch is again released.

Mounted on the frame 1 between the bar 2 and box 21 is a gathering rake 31 comprising a frame made up of cross bars or plates 32 and 33, end bars 34 and rods 35 secured to the cross bars, the forward ends of the rods extending in advance of the bar 33 and being bent to form gathering tines 36. Normally the rake frame and rods incline downwardly and forwardly from the level or bars 4 while the tines 36 are disposed horizontally to travel on or close to the surface of the ground. The bars 32 or 34 are pivoted, as shown at 37, to the bars 4 at or adjacent to the upper end of the rake frame adjacent the front of the box to adapt the rake to be tilted upwardly and rearwardly to discharge rocks gathered by the tines into the box. Bar 32 is preferably provided with an upstanding flange 38 forming an extension of the rake body which projects upwardly between and beyond the bars 4 and serves as a delivery plate or apron over which the rocks may slide as they are discharged into the box. Carried by the frame 1 is a U-shaped member 39, the side arms of which are fixed to the bars 4 and the cross arm of which is arranged to extend across the frame 1 beneath the forward portion of the rake when the latter is in gathering position. This member serves as a stop to limit the downward swing of the rake and as a stay to brace the rake against injury by rocks in a gathering action. It will be seen from the foregoing that the main portions of the rods 35 forming with the cross bars 32 and 33 and end bars 34 the body or frame of the rake provide an inclined surface extending from the tines 36 upwardly to the upper end or head of the rake extending between the side bars and terminating adjacent to the top of the receptacle 21, over which inclined surface the rocks gathered by the tines 36 may slide by gravity directly to the receptacle, instead of being thrown or forcibly impelled thereinto, when the rake is swung upwardly and rearwardly to delivery position. Hence an easy delivery action is secured with less liability of stalling of the rake and less shocks and jars on the rake and receptacle especially when large rocks or a weighty mass of rocks is delivered.

In the operation of the device as thus far described, the picker is drawn over the ground by the tractor and the loose rocks on the ground are gathered by the rake tines. When sufficient rocks have been gathered the rake is operated to deposit the rocks in the gathering box and when the box is filled the controlling cord 29 is actuated to release the latch and permit the box to be tilted to dump the rocks at a desired deposit point in the field or elsewhere. After the load is dumped the cord 29 is manipulated to return the box to receiving position and relatch the gate in the manner previously described.

It will be noted that the rear wheels 5 are so mounted that they lie between the frame bars 4 and travel in a path cleared by the rake. As a result, these wheels are protected to a large extent from damage by rocks and from traveling over rocks and causing the rear end of the frame to jump up and down, which would cause undue wear and tear on the picker. The deflector plate 20 similarly acts to guard the front wheel from damage by rocks and to prevent the front portion of the picker from jumping up and down as it would if not so guarded. As a result, also, of these wheel-guarding actions, the machine will travel for a greater part of its time in operation at a substantially constant level, keeping the tines arranged so as to closely follow the contour of the ground and to pick up rocks which would otherwise be missed.

I provide hydraulic mechanism for actuating the rake to deliver its load to the gathering box, and which may be used to return the rake to normal position, if desired. Mounted on the frame bars 4 are cylinders 40 in which operate double-acting pistons having rods 41 connected to crank arms 42 on the ends of the rake frame. Connected to the opposite ends of each cylinder are supply and return pipes 43, 44 which extend forwardly along the sides of the frame to a point in advance of the front wheel and have their forward end portions 43', 44' suitably formed or constructed for connection with a source of supply of a hydraulic fluid under pressure on the tractor, whereby flow of fluid to and from the cylinders may be effected and controlled. I have not deemed it necessary to show any particular type of hydraulic fluid supply and control means for the purpose, as such means, per se, forms no part of my invention, and as any suitable hydraulic means with control valves such as are in common use may be employed. An advantage in the use of such means is that shocks or jars falling on the rake will be cushioned in an obvious manner, thus reducing liability of damage to this part of the machine.

It will be observed that in my construction the wheels are mounted so as to support the frame for travel at a fairly high level above the surface of the ground which is being worked for the removal of rocks. This permits of the described construction and arrangement of the rock receptacle and rake in the vertical space between the side bars and ground and the mounting of these elements on the side bars so that they are supported in a pendent position directly, or substantially so, from the side bars, whereby a simple and compact arrangement of the working parts is secured, and one in which the receptacle and rake are sustained against the weight of the gathered rocks, thus reducing the working strains on all parts of the machine. Furthermore, this construction and arrangement adapts the hydraulic cylinders to be mounted on the side bars so that their piston rods may be coupled directly to the rake without the use of connections having complex movements and liable to be damaged in use and which add to the cost of construction and maintenance of the machine. In addition, the specified construction and arrangement of parts permits of the building of a machine which is light in weight and of comparatively small size, but which is strong and durable and capable of withstanding the rough usage to which machines of this character are subjected in use. As the rear wheels and rake of this machine are arranged within the vertical planes of the sides of the frame, the weight of the gathered rocks is confined to the areas in which the rake is firmly supported which renders the working action of the rake easier and does away with any tendency of the rake to bind or the machine to tilt under the weight of rocks gathered at the sides of the rake, as would be the case if the rake were extended beyond the sides of the frame. Hence the rake may travel with its tines 36 always in a horizontal position and close to or in direct contact with the ground surface. By the use of two hydraulic cylinders, one at each side of the frame and coupled to the rake at or adjacent to each side of the frame, proper space is provided for the mounting of the receptacle and rake in close relation and without interference from or with the cylinders, and with the advantage of more uniformly and efficiently applying the power of the pistons to operate the rake and to cushion its movements on its return each time from delivery to gathering position.

From the foregoing description, taken in connection with the drawings, the construction and mode of operation of my improved picker will be readily understood without a further and extended description. Its advantages are that it is simple, reliable and efficient in construction, not easily subject to breakage, and it is to a large extent automatic in operation. While the construction shown is preferred, it will, of course, be understood that changes in the form, construction and arrangement of parts may be made, within the scope of the appended claims, without departing from the spirit or sacrificing any of the advantages of the invention.

Having thus described my invention, I claim:

1. A rock picker comprising a wheeled supporting frame including rigidly connected longitudinal side bars, an open-topped receptacle arranged at the rear of the frame between the side bars and pivotally connected to the side bars to swing to a downwardly and rearwardly inclined dumping position from a receiving position in which its open top is disposed substantially in the horizontal plane of the side bars, means for holding the receptacle in its receiving position and controlling its dumping movement, a rake arranged between the side bars in front of the receptacle and extending upwardly beyond the side bars and comprising a rake body formed of rigidly connected side and intermediate members, said rake body being directly pivoted adjacent its upper end to the side bars with its upper end disposed adjacent to the open top of the receptacle and normally extending at a downward and forward angle of inclination therefrom below the side bars and provided at its lower end with forwardly projecting gathering tines, the construction of the rake and arrangement of its pivotal connections with the side bars being such that the rake may be swung upward on said connections to directly support the rake and its load from the side bars and dispose the rake body at a downward and rearward angle of inclination relative to the receptacle with its upper end overlapping the top of the receptacle to form an inclined chute for the sliding delivery of gathered rock along its surface into the receptacle, crank arms directly fixed to the rake body adjacent to and extending above its pivotal connections, hydraulic cylinders mounted on the side bars, and positions in the cylinders having rods connected to said crank arms.

2. A rock picker comprising a wheeled supporting frame having longitudinal side bars and front and rear cross bars connecting the same, an open-topped receptacle arranged at the rear of the frame between the side bars, bracket members fixed to the side bars and pivotally suspending the receptacle therefrom so as to lie in receiving position with its open top disposed substantially in the horizontal plane of the side bars and mounting the receptacle for tilting motion to a downwardly and rearwardly inclined dumping position, means for holding the receptacle in its receiving position and controlling its dumping movement, a rake arranged between the side bars in front of the receptacle and extending upwardly beyond the side bars and comprising a rake body formed of rigidly connected side and intermediate members, said rake body being directly pivoted at its sides adjacent its upper end to the side bars with its upper end disposed adjacent to the open top of the receptacle and normally extending at a downward and forward angle of inclination therefrom below the side bars and provided at its lower end with forwardly projecting gathering tines, the construction of the rake and arrangement of its pivotal connections with the side bars being such that the rake may be swung upward on said connections to directly support the rake and its load from the side bars and dispose the rake body at a downward and rearward angle of inclination relative to the receptacle with its upper end overlapping the top of the receptacle to form an inclined chute for the sliding delivery of gathered rock along its surface into the receptacle, crank arms directly fixed to the rake body adjacent to and extending above its pivotal connections, hydraulic cylinders mounted on the side bars, and pistons in the cylinders having rods connected to said crank arms.

ANTON M. JOCHIM.

References Cited in the file of this patent

UNITED STATES PATENTS

| Number | Name | Date |
|---|---|---|
| 45,970 | Brewster et al. | Jan. 24, 1865 |
| 124,122 | Davis | Feb. 27, 1872 |
| 515,679 | Hawkins | Feb. 27, 1894 |
| 572,213 | Ottersten | Dec. 1, 1896 |
| 1,540,940 | Howard et al. | June 9, 1925 |
| 1,563,340 | Christensen | Dec. 1, 1925 |
| 2,218,579 | Jones et al. | Oct. 22, 1940 |
| 2,296,085 | Boldt | Sept. 15, 1942 |
| 2,388,411 | Hicks | Nov. 6, 1945 |
| 2,419,154 | O'Brien | Apr. 15, 1947 |
| 2,491,079 | Bestland | Dec. 13, 1949 |
| 2,519,136 | Jochim | Aug. 15, 1950 |